United States Patent
Kunii et al.

(10) Patent No.: US 10,764,409 B2
(45) Date of Patent: Sep. 1, 2020

(54) DATA COMMUNICATION DEVICE, ARITHMETIC PROCESSING DEVICE, AND CONTROL METHOD OF DATA COMMUNICATION DEVICE

(71) Applicant: FUJITSU LIMITED, Kawasaki-shi, Kanagawa (JP)

(72) Inventors: Jouji Kunii, Kawasaki (JP); Souta Kusachi, Yokohama (JP); Yuichiro Ajima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/106,681

(22) Filed: Aug. 21, 2018

(65) Prior Publication Data
US 2019/0075191 A1    Mar. 7, 2019

(30) Foreign Application Priority Data

Sep. 1, 2017    (JP) .................................. 2017-168431

(51) Int. Cl.
*H04L 12/841* (2013.01)
*H04L 29/06* (2006.01)
(Continued)

(52) U.S. Cl.
CPC .............. *H04L 69/22* (2013.01); *H04J 3/047* (2013.01); *H04L 12/18* (2013.01); *H04L 47/283* (2013.01); *H04L 2001/0093* (2013.01)

(58) Field of Classification Search
CPC . H04L 69/22; H04L 12/18; H04L 2001/0093; H04L 47/283; H04J 3/047
See application file for complete search history.

(56) References Cited

U.S. PATENT DOCUMENTS 5,293,378 A * 3/1994 Shimizu ................. H04L 29/06
                                                           370/474
5,440,545 A * 8/1995 Buchholz .............. H04L 1/1614
                                                           370/426

(Continued)

FOREIGN PATENT DOCUMENTS

EP    1764704 A2 *  3/2007  ......... G06F 13/4278
JP    2015-1960       1/2015

OTHER PUBLICATIONS

Patent Abstracts of Japan English abstract for Japanese Patent Publication No. 2015-1960, published Jan. 5, 2015.

*Primary Examiner* — Un C Cho
*Assistant Examiner* — Lalita W Pace
(74) *Attorney, Agent, or Firm* — Staas & Halsey LLP

(57) ABSTRACT

A data communication device communicating with other devices via multiple communication paths includes a transmission unit and a reception unit. The transmission unit is configured to receive a packet containing header information and data, to output the header information to each of the communication paths, to divide the data into multiple data pieces, and to output the data pieces to the respective communication paths. The reception unit is configured to receive header information and a data piece for each of the communication paths, and to reconstruct a packet from the header information and the data piece received from each of the communication paths. In reconstructing the packet, the reception unit adjusts, for each of the communication paths, output timing of the data piece, based on the header information.

6 Claims, 8 Drawing Sheets

|  | LANE0 [63:0] | LANE1 [63:0] | LANE2 [63:0] | LANE3 [63:0] |
|---|---|---|---|---|
| 0cycle | Start+SFD | Start+SFD | Start+SFD | Start+SFD |
| 1cycle | Code00 | Code00 | Code00 | Code00 |
| 2cycle | Data00 | Data01 | Data02 | Data03 |
| | ... | ... | ... | ... |
| | ... | ... | ... | ... |
| | ... | ... | ... | ... |
| (N/4+2)cycle | DataN0 | DataN0+1 | DataN0+2 | DataN0+3 |
| (N/4+3)cycle | Terminate | Terminate | Terminate | Terminate |

(51) Int. Cl.
*H04J 3/04* (2006.01)
*H04L 12/18* (2006.01)
*H04L 1/00* (2006.01)

(56) References Cited

U.S. PATENT DOCUMENTS

| | | | | |
|---|---|---|---|---|
| 6,081,523 | A  * | 6/2000 | Merchant | H04L 25/14 370/389 |
| 7,573,916 | B1 * | 8/2009 | Bechtolsheim | H04L 12/4633 370/359 |
| 9,356,866 | B1 * | 5/2016 | Sivaramakrishnan | H04L 45/7453 |
| 9,407,504 | B1 * | 8/2016 | Di Benedetto | H04L 12/4633 |
| 2001/0027486 | A1 * | 10/2001 | Takamoto | H04L 1/1809 709/227 |
| 2007/0076517 | A1 * | 4/2007 | Kyung | G11C 7/1051 365/189.15 |
| 2007/0223472 | A1 * | 9/2007 | Tachibana | H04L 47/10 370/389 |
| 2007/0297460 | A1 * | 12/2007 | Muneishi | H04J 3/0632 370/516 |
| 2011/0126039 | A1 * | 5/2011 | Kim | G06F 1/06 713/501 |
| 2014/0013179 | A1 * | 1/2014 | Takaku | H04L 1/0045 714/748 |
| 2014/0325107 | A1 * | 10/2014 | Iwatsuki | G06F 1/10 710/124 |
| 2019/0058909 | A1 * | 2/2019 | Eyer | H04N 21/4627 |

* cited by examiner

FIG.7

|  | LANE0 [63:0] | LANE1 [63:0] | LANE2 [63:0] | LANE3 [63:0] |
|---|---|---|---|---|
| 0cycle | Code00 | Data00 | Data01 | Data02 |
| 1cycle | Data03 | Data04 | Data05 | Data06 |
| 2cycle | Data07 | Data08 | Data09 | Data10 |
|  | ... | ... | ... | ... |
|  | ... | ... | ... | ... |
|  | ... | DataN0 | DataN0+1 | DataN0+2 |
| (N/4+1)cycle | DataN0+3 |  |  |  |

FIG.8

|  | LANE0 [63:0] | LANE1 [63:0] | LANE2 [63:0] | LANE3 [63:0] |
|---|---|---|---|---|
| 0cycle | Start+SFD | Start+SFD | Start+SFD | Start+SFD |
| 1cycle | Code00 | Code00 | Code00 | Code00 |
| 2cycle | Data00 | Data01 | Data02 | Data03 |
|  | ... | ... | ... | ... |
|  | ... | ... | ... | ... |
|  | ... | ... | ... | ... |
| (N/4+2)cycle | DataN0 | DataN0+1 | DataN0+2 | DataN0+3 |
| (N/4+3)cycle | Terminate | Terminate | Terminate | Terminate |

FIG.11

| | LANE0 [63:0] | LANE1 [63:0] | LANE2 [63:0] | LANE3 [63:0] |
|---|---|---|---|---|
| 0cycle | ... | Start+SFD | ... | ... |
| 1cycle | Start+SFD | Code00 | ... | Start+SFD |
| 2cycle | Code00 | Data01 | Start+SFD | Code00 |
| 3cycle | Data00 | ... | Code00 | Data03 |
| 4cycle | ... | ... | Data02 | ... |
| | ... | ... | ... | ... |
| (N/4+2)cycle | ... | DataN0+1 | ... | ... |
| (N/4+3)cycle | DataN0 | Terminate | ... | DataN0+3 |
| (N/4+4)cycle | Terminate | ... | DataN0+2 | Terminate |
| (N/4+5)cycle | ... | ... | Terminate | ... |

…

DATA COMMUNICATION DEVICE, ARITHMETIC PROCESSING DEVICE, AND CONTROL METHOD OF DATA COMMUNICATION DEVICE

CROSS-REFERENCE TO RELATED APPLICATION

This application is based upon and claims the benefit of priority of the prior Japanese Patent Application No. 2017-168431, filed on Sep. 1, 2017, the entire contents of which are incorporated herein by reference.

FIELD

The embodiments discussed herein relate to a data communication device, an arithmetic processing device, and a control method of the data communication device.

BACKGROUND

A data communication system for transmitting data by using multiple communication paths is known (see Patent Document 1, for example). The data communication system disclosed in Patent Document 1 includes multiple communication paths for serial data transmission, a transmitting device, and a receiving device. The transmitting device includes a packet generating means for generating multiple packets based on information to be transmitted, multiple transmitting means for performing serial transmission of the packet, and a distributing means for distributing the packets to the transmitting means. The receiving device includes multiple receiving means for receiving the packets transmitted via the communication paths, and a retrieving means for retrieving the information from the received packets.

In the data communication system disclosed in Patent Document 1, data to be transmitted may be formed into multiple packets, and the packets are distributed to multiple communication paths. If a length of each communication path differs, or if a timing of receiving packets by each of the receiving means is not synchronized, an arrival order of the packets may be different from an order when the packets are transmitted. Accordingly, it is difficult to reconstruct data from the received packets.

The following is reference documents:
[Patent Document 1] Japanese Laid-Open Patent Publication No. 2015-001960.

SUMMARY

A data communication device communicating with other devices via multiple communication paths includes a transmission unit and a reception unit. The transmission unit is configured to receive a packet containing header information and data, to output the header information to each of the communication paths, to divide the data into multiple data pieces, and to output the data pieces to the respective communication paths. The reception unit is configured to receive header information and a data piece for each of the communication paths, and to reconstruct a packet from the header information and the data piece from each of the communication paths. In reconstructing the packet, the reception unit adjusts, for each of the communication paths, output timing of the data piece, based on the header information.

The object and advantages of the invention will be realized and attained by means of the elements and combinations particularly pointed out in the claims. It is to be understood that both the foregoing general description and the following detailed description are exemplary and explanatory and are not restrictive of the invention.

BRIEF DESCRIPTION OF DRAWINGS

FIG. 7 is a diagram illustrating a packet;

FIG. 8 is a diagram illustrating transmission data;

FIG. 11 is a diagram illustrating received data.

DESCRIPTION OF EMBODIMENT

Figure 1:
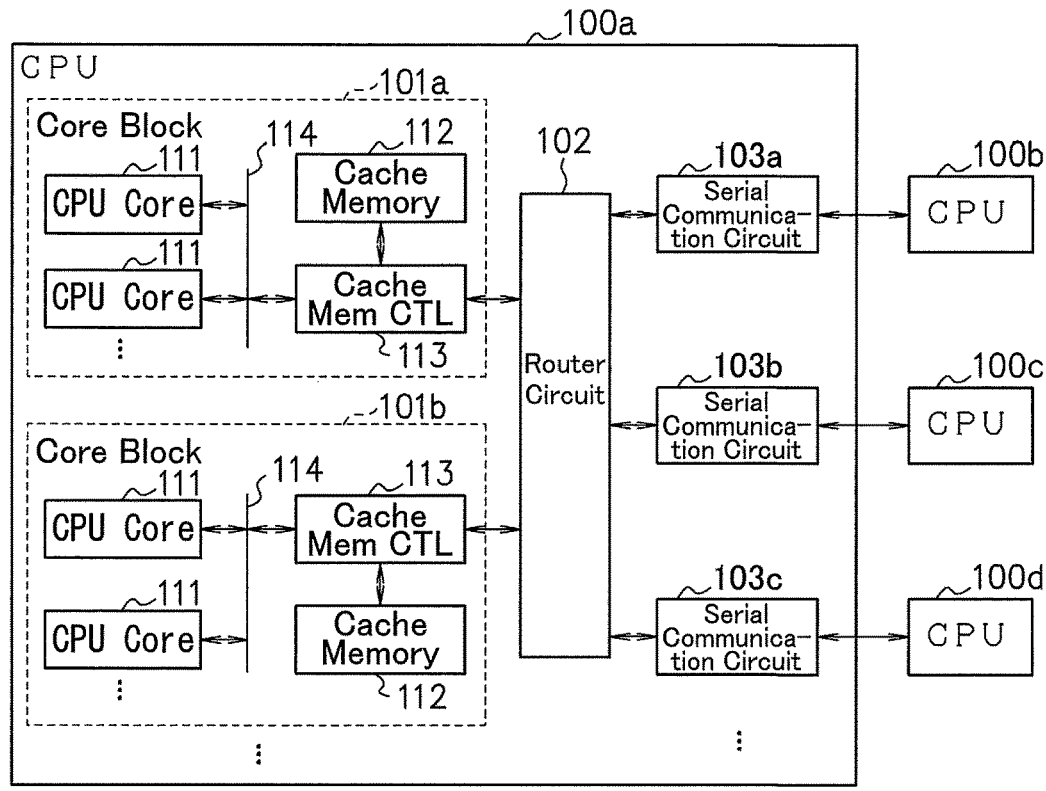
FIG. 1 is a diagram illustrating an example of a configuration of an information processing apparatus according to an embodiment of the present disclosure.

FIG. 1 is a diagram illustrating an example of a configuration of an information processing apparatus according to an embodiment of the present disclosure. The information processing apparatus includes multiple central processing units (CPUs) 100*a*, 100*b*, 100*c*, and 100*d*. The CPUs 100*a* to 100*d* are arithmetic processing devices (processors). The CPU 100*a* includes multiple core blocks 101*a* and 101*b*, a router circuit 102, and multiple serial communication circuits 103*a*, 103*b*, and 103*c*. Each of the core blocks 101*a* and 101*b* includes multiple CPU cores 111, a cache memory 112, a cache memory controller 113 (labeled as "Cache Mem CTL" in the drawing), and a bus 114. The cache memory 112 stores instructions (program) and data. The cache memory controller 113 controls write operations and read operations to the cache memory 112. The CPU core 111 performs various processes by executing instructions stored in the cache memory 112. The CPUs 100*b* to 100*d* also have similar configurations to the CPU 100*a*. In the following, as an example, a configuration of the CPU 100*a* is mainly described.

First, a data transmitting method of the CPU 100*a* will be described. Each of the core blocks 101*a* and 101*b* can generate a packet including data, and output a request for packet transmission to the router circuit 102. The router circuit 102 generates header information including destination information (information concerning a destination of the packet), adds the header information to the packet, and outputs the packet to, based on the destination information, one of the serial communication circuits 103*a*, 103*b*, and 103*c*. The serial communication circuit 103*a* converts the packet of parallel data format into serial data format, and transmits to the CPU 100*b*. The serial communication circuit 103*b* converts the packet of parallel data format into serial data format, and transmits to the CPU 100c. The serial communication circuit 103c converts the packet of parallel data format into serial data format, and transmits to the CPU 100d.

Next, a data receiving method of the CPU 100a will be described. The serial communication circuit 103a receives a packet from the CPU 100b, and converts the packet of serial data format into parallel data format. The serial communication circuit 103b receives a packet from the CPU 100c, and converts the packet of serial data format into parallel data format. The serial communication circuit 103c receives a packet from the CPU 100d, and converts the packet of serial data format into parallel data format. Both the core blocks 101a and 101b can process a packet received by the serial communication circuits 103a to 103c.

Figure 2:
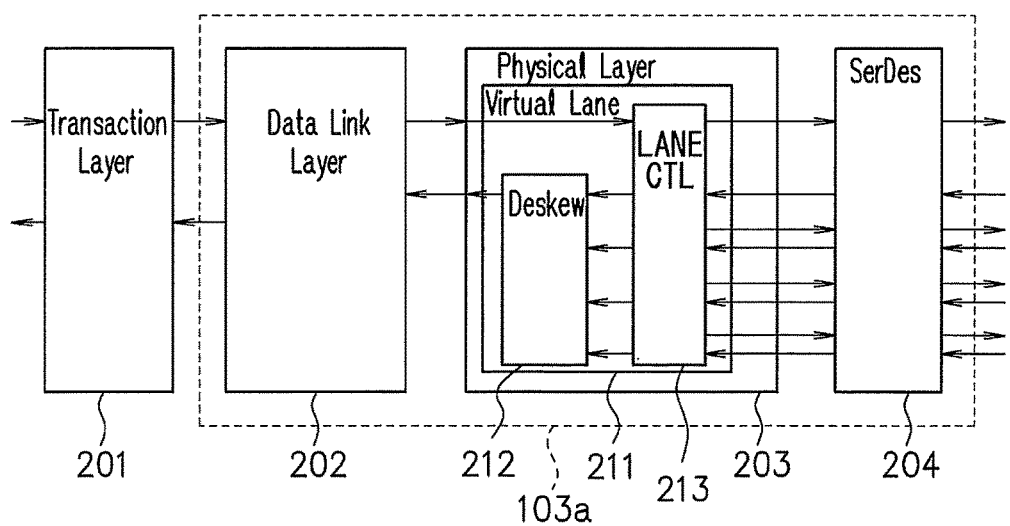
FIG. 2 is a diagram illustrating an example of a configuration of a data communication device according to a basic technology.

FIG. 2 is a diagram illustrating an example of a configuration of a data communication device according to a basic technology. Note that the data communication device is provided at each of the CPUs 100a to 100d. For example, the data communication device in the CPU 100a corresponds to the router circuit 102 and the serial communication circuits 103a to 103c in FIG. 1. The data communication device includes a transaction layer 201, a data link layer 202, a physical layer 203, and a serializer/deserializer (SerDes) 204. The serial communication circuit 103a includes the data link layer 202, the physical layer 203, and the SerDes 204. The serial communication circuits 103b and 103c illustrated in FIG. 1 also have similar configurations to the serial communication circuit 103a in FIG. 2. The transaction layer 201 corresponds to the router circuit 102 in FIG. 1. The physical layer 203 includes a virtual lane unit 211. The virtual lane unit 211 includes a deskew unit 212 and a lane control unit 213 (labeled as "LANE CTL" in the drawing).

First, a data transmitting method of the data communication device will be described. The transaction layer 201 generates a packet by the router circuit 102 receiving a request from the core blocks 101a and 101b. The data link layer 202 outputs the packet to the physical layer 203 on a per 256 bits basis, for example. By using the lane control unit 213, the physical layer 203 divides the packet into pieces, and outputs the pieces to 4 lanes (communication paths). The SerDes 204 receives the pieces of the packet from the 4 lanes, converts, for each lane, format of the pieces of the packet from parallel to serial, and transmits the converted pieces to the CPU 100b through the 4 lanes. The serial communication circuit 103a transmits the data of serial data format to the CPU 100b through the 4 lanes.

Next, a data receiving method of the data communication device will be described. The SerDes 204 receives serial data from the CPU 100b through the 4 lanes. Subsequently, the SerDes 204 converts, for each lane, the received serial data into parallel format, and outputs the converted data to the 4 lanes. The physical layer 203 adjusts data skew (variations of latency) of the 4 lanes by the deskew unit 212, to make output timings of data of the 4 lanes identical.

Figure 3:
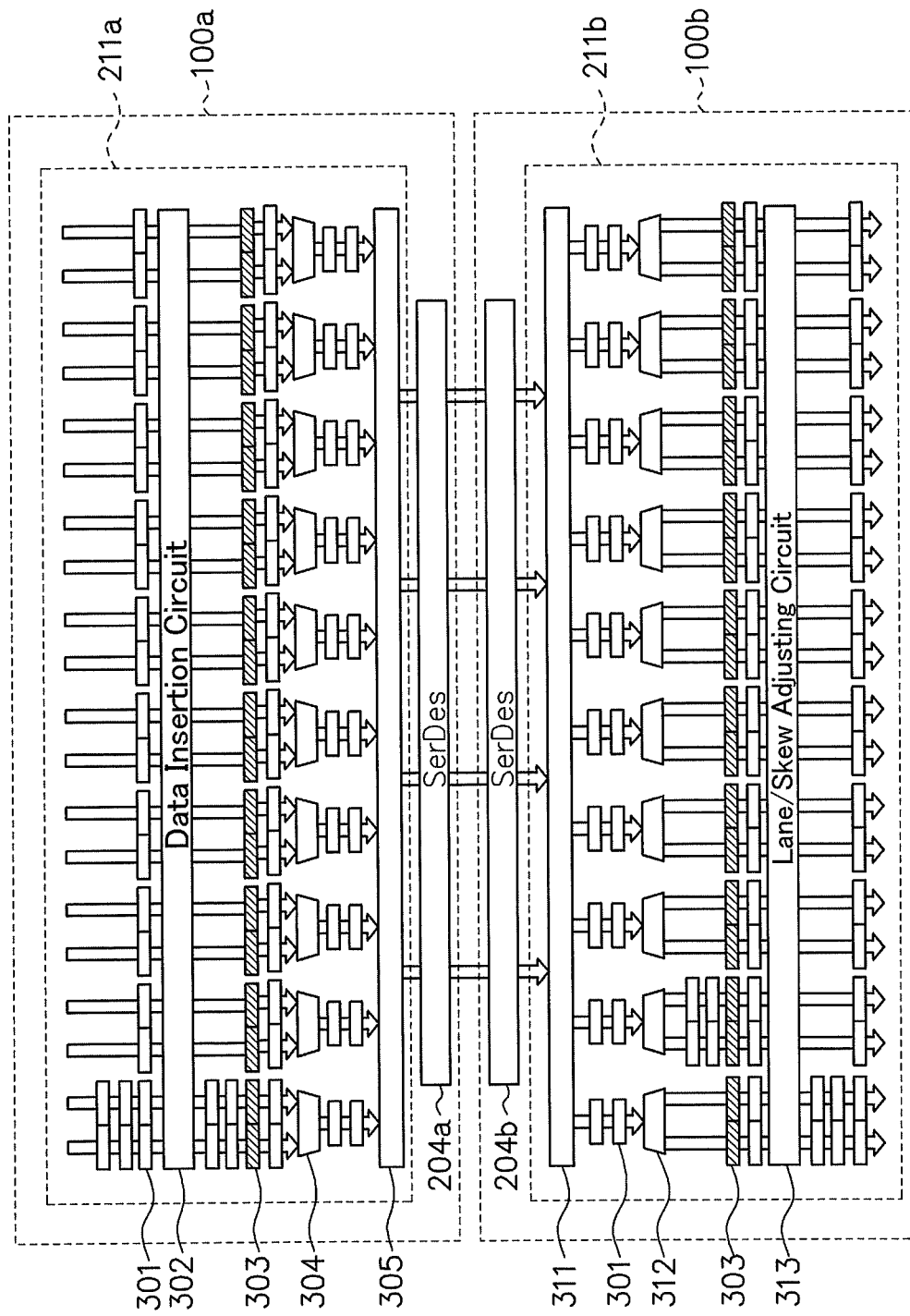
FIG. 3 is a diagram illustrating a concept of data transmission from a CPU to another CPU.

FIG. 3 is a diagram illustrating a concept of a process by the CPU 100a for sending a packet to the CPU 100b. The CPU 100a includes a virtual lane unit 211a and a SerDes 204a. The virtual lane unit 211a corresponds to the virtual lane unit 211 in FIG. 2. The SerDes 204a corresponds to the SerDes 204 in FIG. 2. The virtual lane unit 211a includes a data insertion circuit 302, a selector 304, and a selector 305.

The CPU 100b includes a virtual lane unit 211b and a SerDes 204b. The virtual lane unit 211b corresponds to the virtual lane unit 211 in FIG. 2. The SerDes 204b corresponds to the SerDes 204 in FIG. 2. The virtual lane unit 211b includes a selector 311, a selector 312, and a lane/skew adjusting circuit 313.

First, a data transmitting method by the CPU 100a will be described. The virtual lane unit 211a outputs, for example, 256-bit parallel data to 20 lanes, by dividing the 256-bit parallel data. The data insertion circuit 302 receives data 301 of 20 lanes, and periodically inserts an alignment marker 303 among the data 301 for each lane. The alignment marker 303 includes a lane number of a lane to which the alignment marker 303 is inserted.

The selector 304 converts data of 20 lanes into data of 10 lanes. The selector 305 converts data of 10 lanes into data of 4 lanes. The SerDes 204a converts the data of 4 lanes from parallel data format to serial data format, and transmits the converted data to the CPU 100b through the 4 lanes. As the virtual lane unit 211a can change the number of lanes, the virtual lane unit 211a can be adapted to various types of SerDes.

Next, a data receiving method by the CPU 100b will be described. The SerDes 204b receives data from the CPU 100a through the 4 lanes. Subsequently, the SerDes 204b converts the data, for each lane, from serial data format to parallel data format, and outputs the converted data (parallel data) to the corresponding lane. The SerDes 204b includes a clock data recovery (CDR) circuit for regenerating a clock signal for each lane, based on the received serial data. The SerDes 204b outputs the converted data corresponding to each of the lanes to the corresponding lane, in synchronization with the regenerated clock signal. The clock signal that is regenerated for each lane is not synchronized with that of other lanes. Further, length of the four lanes between the CPU 100a and the CPU 100b is different from each other. Therefore, a timing when the SerDes 204b outputs data of each lane is not identical. The selector 311 converts data of 4 lanes into data of 10 lanes. The selector 312 converts data of 10 lanes into data of 20 lanes. The lane/skew adjusting circuit 313 outputs each data of 20 lanes to a lane of an appropriate lane number, based on the lane number included in the alignment marker 303 which is contained in a set of data of each lane. The lane/skew adjusting circuit 313 also adjusts skew of data of 20 lanes based on the alignment marker 303 in the set of data of each lane, to match a timing of outputting data from each lane. Further, the lane/skew adjusting circuit 313 removes the alignment marker 303. As the virtual lane unit 211b can change the number of lanes, the virtual lane unit 211b can be adapted to various types of SerDes.

The virtual lane unit 211a outputs the alignment markers 303 at a constant interval, to enable the virtual lane unit 211b to adjust data skew and to check a lane number of a lane where data is to be output. Accordingly, because communication traffic for sending the alignment markers 303 by the virtual lane unit 211a increases, a problem of data latency occurs. In the following, a data communication device capable of adjusting data output timings of multiple lanes while reducing communication traffic will be described.

Figure 4:
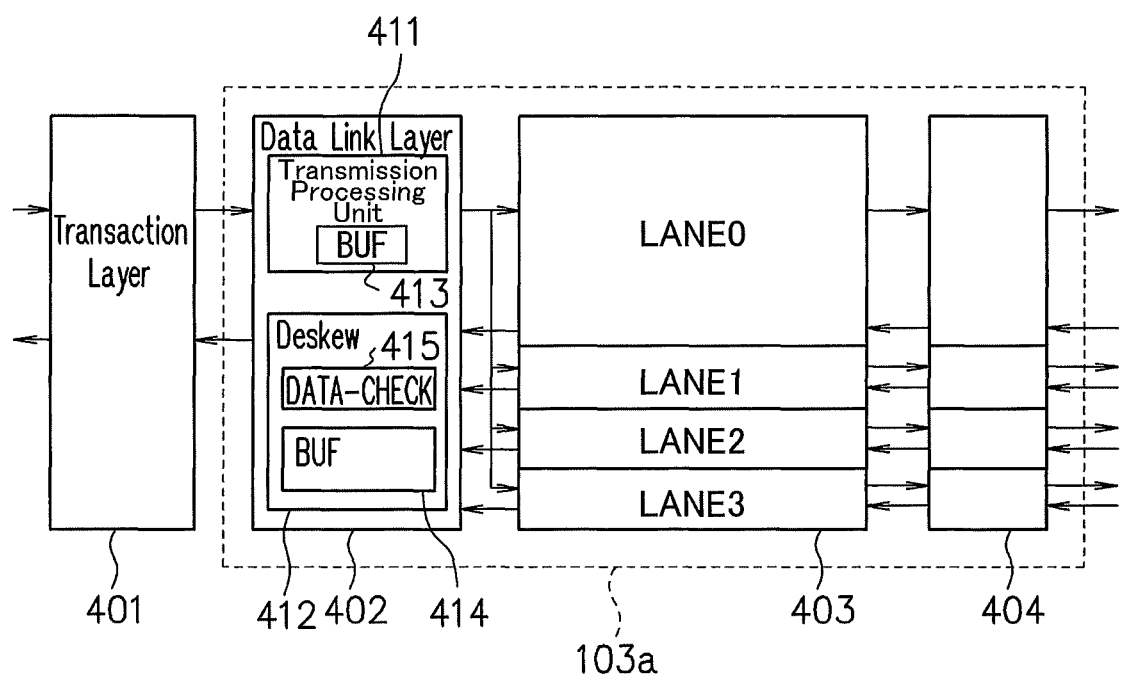
FIG. 4 is a diagram illustrating an example of a configuration of a data communication device according to an embodiment of the present disclosure.

FIG. 4 is a diagram illustrating an example of a configuration of a data communication device according to the embodiment of the present disclosure. Note that the data communication device is provided at each of the CPUs 100a to 100d. For example, the data communication device in the CPU 100a corresponds to the router circuit 102 and the serial communication circuits 103a to 103c in FIG. 1. The data communication device includes a transaction layer 401, a data link layer 402, a physical layer 403, and a SerDes 404. The serial communication circuit 103a includes the data link layer 402, the physical layer 403, and the SerDes 404. The serial communication circuits 103b and 103c illustrated in FIG. 1 also have similar configurations to the serial communication circuit 103a in FIG. 4. The transaction layer 401 corresponds to the router circuit 102 in FIG. 1. The data link layer 402 includes a transmission processing unit 411 and a deskew unit 412. The transmission processing unit 411 includes a buffer unit 413. The deskew unit 412 includes a data check unit 415 and a buffer unit 414.

Figure 5:
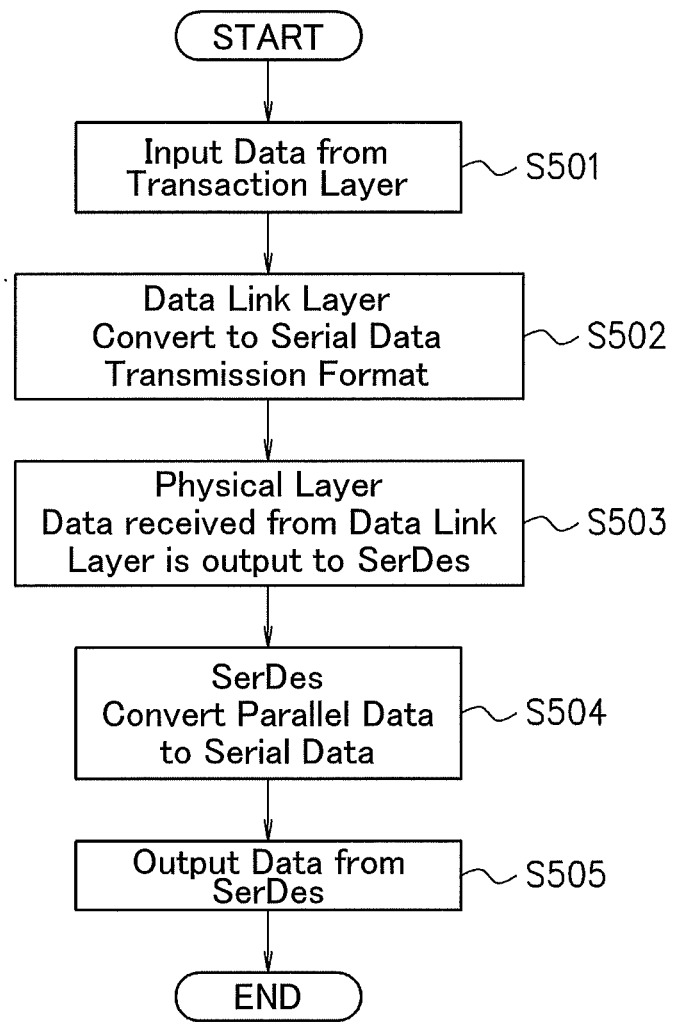
FIG. 5 is a flowchart illustrating a control method performed by a transmission unit of the data communication device in FIG. 4.
Figure 6:
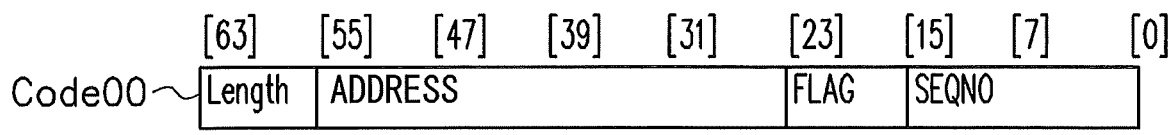
FIG. 6 is a diagram illustrating header information.

FIG. 5 is a flowchart illustrating a control method performed by a transmission unit of the data communication device in FIG. 4. At step S501, the transaction layer 401 receives a packet transmission request for transmitting data Data00 to DataN0+3 (illustrated in FIG. 7) from the core block 101a or 101b. Next, the transaction layer 401 generates header information Code00 (illustrated in FIG. 6) by using the router circuit 102. The header information Code00 includes a packet length (Length), packet destination information (ADDRESS), additional information (FLAG), and a packet number (SEQNO). When the CPU 100a transmits a packet, the packet destination information (ADDRESS) in the packet will be CPU 100b, CPU 100c, or CPU 100d. The additional information (FLAG) is information about a packet other than the packet length (Length) and the packet destination information (ADDRESS). The packet number (SEQNO) is a number unique to each packet, and is added by the data link layer 402 afterwards. Next, the transaction layer 401 generates a packet by adding the header information Code00 to a head of the data Data00, as illustrated in FIG. 7. The packet illustrated in FIG. 7 includes the header information Code00, and data Data00 to DataN0+3. Next, the transaction layer 401 outputs the packet in FIG. 7 to a data link layer 402 of one of the serial communication circuits 103a, 103b, and 103c. When outputting the packet, the transaction layer 401 outputs 256 bits (=64×4) of data in each cycle.

Next, at step S502, the data link layer 402 receives the packet illustrated in FIG. 7. The data link layer 402 then stores the packet into the buffer unit 413, and writes a packet number (SEQNO) into the header information Code00 stored on the buffer unit 413, to generate transmission data as illustrated in FIG. 8, which is a data format of serial data transmission. Subsequently, the data link layer 402 divides the transmission data in FIG. 8 into four of 64-bit data streams for transmitting the transmission data via the four lanes (LANE0 to LANE3). Specifically, at 0 cycle, the data link layer 402 outputs 64-bit start information (Start+SFD) to each of the four lanes (LANE0 to LANE3). The start information (Start+SFD) includes a start bit (Start) and a start of frame delimiter (SFD), and indicates a start position of a packet of the respective lanes (LANE0 to LANE3). Next, at 1 cycle, the data link layer 402 outputs the same header information Code00 (FIG. 6) to each of the four lanes (LANE0 to LANE3). Thereafter, for each cycle, the data link layer 402 divides data Data00 to DataN0+3 and outputs the divided data to the four lanes (LANE0 to LANE3). At the last cycle ((N/4+3) cycle in FIG. 8), the data link layer 402 outputs the 64-bit termination information (Terminate) to each of the four lanes (LANE0 to LANE3).

Next, at step S503, the physical layer 403 receives the transmission data in FIG. 8 through the four lanes (LANE0 to LANE3). Next, the physical layer 403 scrambles the received transmission data for a noise countermeasure, and outputs the scrambled transmission data through the four lanes (LANE0 to LANE3).

Next, at step S504, the SerDes 404 receives the scrambled transmission data through the four lanes (LANE0 to LANE3). Next, the SerDes 404 converts the scrambled transmission data into serial data format. The conversion is performed for each lane. For example, a process for converting 64-bit parallel data into serial data is performed for each of the lanes (LANE0 to LANE3). Accordingly, 4 serial data streams are generated.

Next, at step S505, the SerDes 404 transmits the four serial data streams through the respective four lanes (LANE0 to LANE3). For example, the serial communication circuit 103a transmits serial data to the CPU 100b via the four lanes (LANE0 to LANE3).

As described above, the transmission unit of the data communication device outputs a same header information Code00 to the four lanes (LANE0 to LANE3), then divides data (Data00 to DataN0+3) in a packet into four data streams, converts each of the four data streams into serial data format, and sends the four serial data streams via the respective lanes (LANE0 to LANE3). Also, before sending the header information Code00, the transmission unit transmits the start information (Start+SFD) to each of the four lanes (LANE0 to LANE3).

Note that a data transmission process performed by each of the serial communication circuits 103b and 103c is similar to the above described data transmission process performed by the serial communication circuit 103a. Also, a data transmission process performed by each of the CPUs 100b to 100d is similar to the above described data transmission process performed by the CPU 100a.

Figure 9:
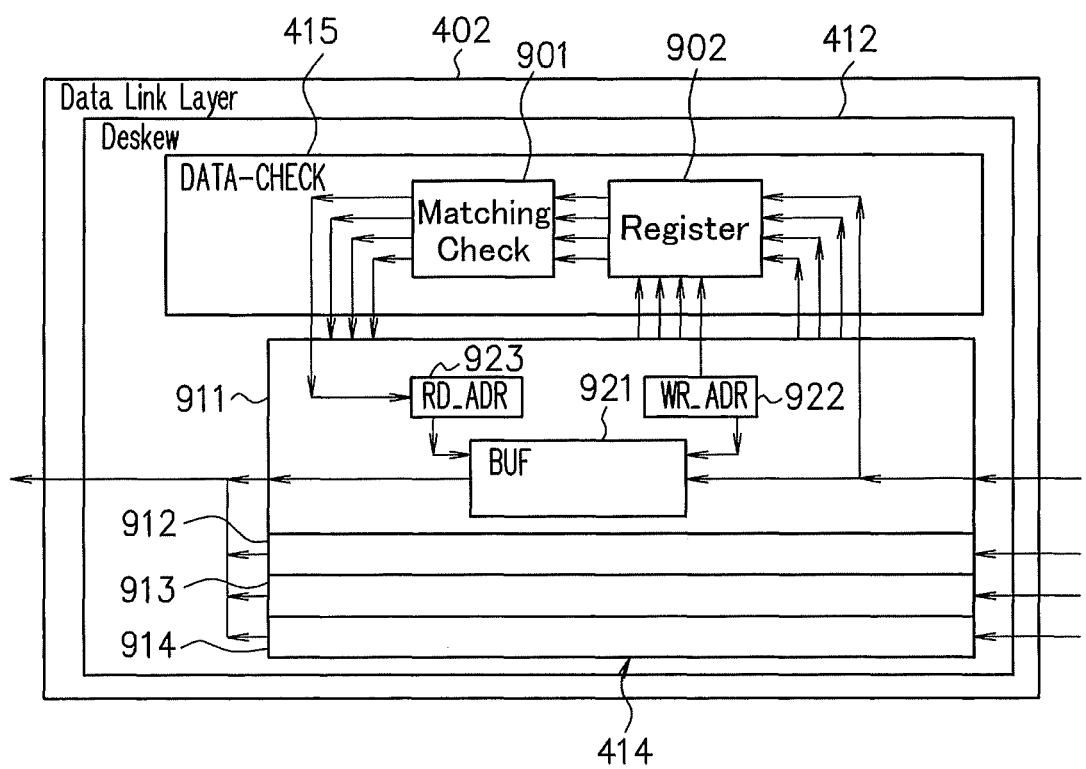
FIG. 9 is a diagram illustrating an example of a configuration of a deskew unit in a data link layer illustrated in FIG. 4.

FIG. 9 is a diagram illustrating an example of a configuration of the deskew unit 412 in the data link layer 402 illustrated in FIG. 4. The deskew unit 412 includes the data check unit 415 and the buffer unit 414. The buffer unit 414 includes a buffer part 911 for the lane LANE0, a buffer part 912 for the lane LANE1, a buffer part 913 for the lane LANE2, a buffer part 914 for the lane LANE3. Each of the buffer parts 911 to 914 includes a buffer 921, a write address (WR_ADR) 922, and a read address (RD_ADR) 923. The data check unit 415 includes a matching check unit 901 and a register 902.

Figure 10:
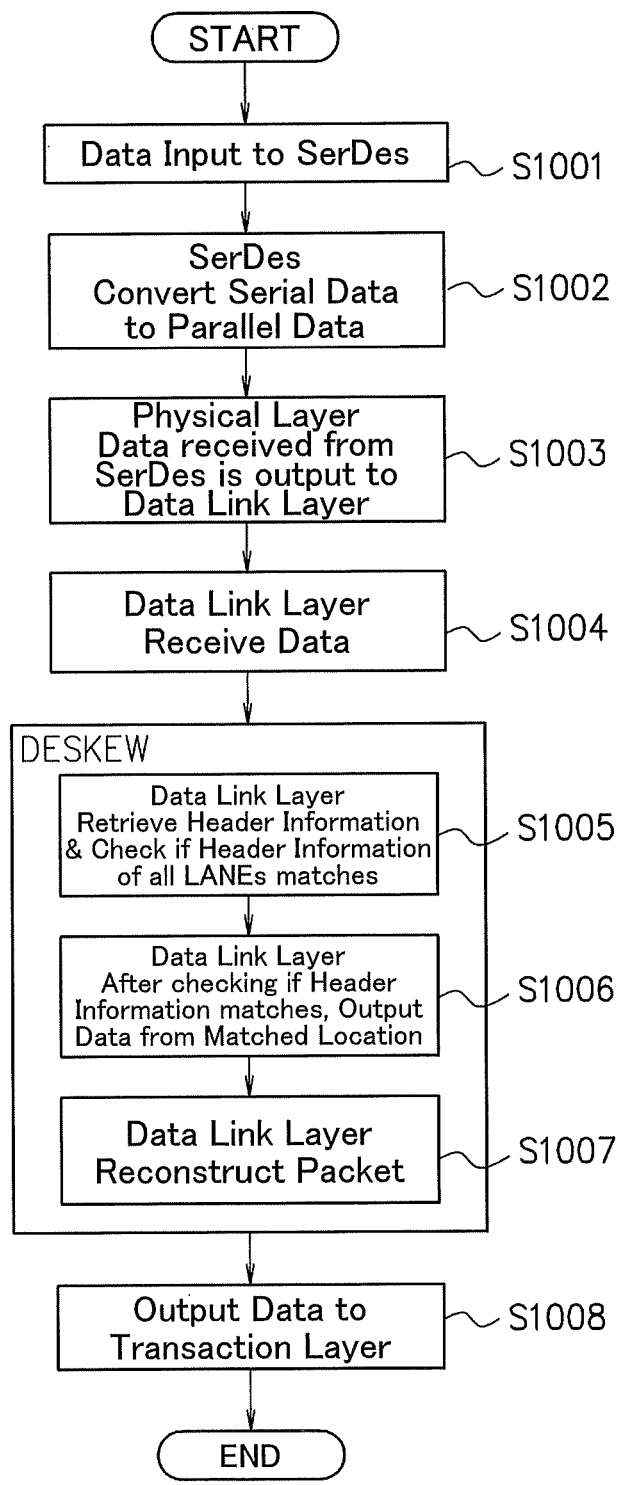
FIG. 10 is a flowchart illustrating a control method performed by a reception unit of the data communication device in FIG. 4.

FIG. 10 is a flowchart illustrating a control method performed by a reception unit of the data communication device in FIG. 4. At step S1001, the SerDes 404 receives, via the four lanes (LANE0 to LANE3), data transmitted by another CPU having performed the process in FIG. 5.

Next, at step S1002, the SerDes 404 converts the data, for each of the lanes (LANE0 to LANE3), from serial data format to parallel data format. For example, the SerDes 404 converts the data (serial data format) to parallel data of 64 bits, for each of the lanes (LANE0 to LANE3). Next, the SerDes 404 outputs the parallel data of each of the four lanes (LANE0 to LANE3) to the physical layer 403, as illustrated in FIG. 11. Specifically, the SerDes 404 outputs 256-bit (=64×4) data for each cycle.

The SerDes 404 includes a clock data recovery (CDR) circuit for regenerating a clock signal for each of the lanes (LANE0 to LANE3), based on the received serial data. The SerDes 404 outputs each of the parallel data to the corresponding lane, in synchronization with the regenerated clock signal. The clock signal that is regenerated for each lane is not synchronized with that of other lanes. Further, length of the four lanes between the CPU 100a and the CPU 100b is different from each other. Therefore, as can be seen from a comparison between FIG. 8 and FIG. 11, a timing (latency) when data is output to each of the lanes (LANE0 to LANE3) is not identical.

Next, at step S1003, the physical layer 403 receives the parallel data such as illustrated in FIG. 11 through the four lanes (LANE0 to LANE3). The data received at step S1003 is scrambled for a noise countermeasure. Subsequently, the physical layer 403 descrambles the parallel data and outputs the descrambled parallel data through the four lanes (LANE0 to LANE3).

Next, at step S1004, the data link layer 402 receives the (descrambled) parallel data through the four lanes (LANE0 to LANE3). Subsequently, for each cycle, in the buffer part 911, the data link layer 402 writes the parallel data of LANE0 to an address in the buffer 921 indicated by the write address (WR_ADR) 922, and increments the WR_ADR 922. Similarly, for each cycle, in the buffer part 912, the data link layer 402 writes the parallel data of LANE1 to an address in the buffer 921 indicated by the WR_ADR 922, and increments the WR_ADR 922. Similarly, for each cycle, in the buffer part 913, the data link layer 402 writes the parallel data of LANE2 to an address in the buffer 921 indicated by the WR_ADR 922, and increments the WR_ADR 922. Similarly, for each cycle, in the buffer part 914, the data link layer 402 writes the parallel data of LANE3 to an address in the buffer 921 indicated by the WR_ADR 922, and increments the WR_ADR 922.

Next, at step S1005, by the data check unit 415, the data link layer 402 detects the start information (Start+SFD) of the lanes (LANE0 to LANE3) from the respective buffer parts 911 to 914, and, for each of the lanes (LANE0 to LANE3), identifies a location (address in the buffer part) of the header information Code00 stored next to the start information (Start+SFD). Next, by the data check unit 415, the data link layer 402 writes the header information Code00 and the address (in the buffer part) of the header information Code00 of each of the lanes (LANE0 to LANE3), into the register 902.

For example, in FIG. 11, the data check unit 415 detects the header information Code00 of the lane LANE1, and writes the header information Code00 of the lane LANE1 and the address (in the buffer part) of the header information Code00 of the lane LANE1 into the register 902. Next, the data check unit 415 detects the header information Code00 of the lanes (LANE0 and LANE3), and writes the header information Code00 of the lanes (LANE0 and LANE3) and the addresses (in the buffer parts) of the header information Code00 of the lanes (LANE0 and LANE3) into the register 902. Lastly, the data check unit 415 detects the header information Code00 of the lane LANE2, and writes the header information Code00 of the lane LANE2 and the address (in the buffer part) of the header information Code00 of the lane LANE2 into the register 902.

Next, by the matching check unit 901, the data link layer 402 determines if the header information Code00 of all the four lanes (LANE0 to LANE3) is identical. In a case in which the header information Code00 of all the four lanes (LANE0 to LANE3) belongs to a same packet, the packet numbers SEQNO in the header information Code00 of all the four lanes (LANE0 to LANE3) are expected to be identical. Accordingly, if the packet numbers SEQNO in the header information Code00 of all the four lanes (LANE0 to LANE3) are identical, the matching check unit 901 determines that the header information Code00 of all the four lanes (LANE0 to LANE3) is identical. Conversely, in a case in which the header information Code00 of all the four lanes (LANE0 to LANE3) does not belong to a same packet, the packet numbers SEQNO in the header information Code00 of all the four lanes (LANE0 to LANE3) are not identical. Accordingly, if the packet numbers SEQNO in the header information Code00 of all the four lanes (LANE0 to LANE3) are not identical, the matching check unit 901 determines that the header information Code00 of all the four lanes (LANE0 to LANE3) is not identical.

In a case in which the matching check unit 901 determines that the header information Code00 of all the four lanes (LANE0 to LANE3) is identical, the matching check unit 901 sets, for each of the four lanes (LANE0 to LANE3), the address of the header information Code00 of each of the four lanes (LANE0 to LANE3) to the read address (RD_ADR) 923 in the corresponding buffer part (911, 912, 913, or 914), and instructs the buffer parts 911 to 914 to start reading out data.

Next, at step S1006, each of the buffer parts 911 to 914 starts reading out data (the header information Code00 and the data Data00 to DataN0+3) from an address in the buffer 921 indicated by the read address 923. The read operations by the buffer parts 911 to 914 are executed at the same timing. By the read operation being performed by the buffer parts 911 to 914, the header information Code00 and the data Data00 to DataN0+3 of each lane is read out from the buffer 921 of each lane at coincident timings, as illustrated in FIG. 8.

Next, at step S1007, the data link layer 402 reconstructs the packet including the header information Code00 and the data Data00 to DataN0+3, as illustrated in FIG. 7, based on the data read out from the buffer 921. Specifically, the following operations are performed.

In an initial state, as the address of the header information Code00 of each of the four lanes (LANE0 to LANE3) is set to the buffer part (911, 912, 913, or 914), Code00 is read out from each of the buffer parts (911, 912, 913, and 914) at first. However, since only one header information (Code00) is necessary, the header information (Code00) that was read out from the buffer part 911 is used to reconstruct the packet, and the other data pieces (Code00) that were read out from the buffer parts (912, 913, and 914) are discarded. Next, the data link layer 402 selects next data (Data00, Data01, and Data02) in the buffer parts (911, 912, and 913) respectively, and constructs 256-bit data of one cycle from Code00 (which was read out from the buffer part 911), Data00, Data01, and Data02.

Next, the data link layer 402 selects next data pieces that were read out from each of the buffer parts (914, 911, 912, and 913), and, by using the selected data pieces, the data link layer 402 constructs 256-bit data. For example, after the 256-bit data consisting of Code00, Data00, Data01, and Data02 is constructed, the data link layer 402 selects, as next data pieces, Data03 from the buffer part 914, Data04 from the buffer part 911, Data05 from the buffer part 912, and Data06 from the buffer part 913, and the data link layer 402 constructs 256-bit data consisting of Data03, Data04, Data05, and Data06. By repeating this operation, the packet as illustrated in FIG. 7 is reconstructed.

Note that the header information Code00 includes a packet length, as mentioned earlier. Accordingly, based on the packet length information, the data link layer 402 recognizes, for each lane, the last data constituting a packet, and can reconstruct a packet not including unnecessary information (such as the termination information (Terminate)).

Next, at step S1008, the data link layer 402 outputs the packet reconstructed at step S1007 to the transaction layer 401. The transaction layer 401 processes the packet by receiving the packet and transmitting the packet to the core block 101a or 101b.

As described above, the reception unit of the data communication device receives the header information Code00 and the data Data00 to DataN0+3 of each of the four lanes (LANE0 to LANE3), controls a timing of outputting data of each of the four lanes (LANE0 to LANE3) based on the header information Code00 of each of the four lanes (LANE0 to LANE3), and reconstructs a packet containing the header information Code00 and the data Data00 to DataN0+3.

Note that a method of reconstructing a packet performed by the reception unit is not limited to the above described method. In another embodiment, for example, the above mentioned steps S1006 and S1007 may be executed in parallel. An example of a process in which steps S1006 and S1007 are executed in parallel will be described below. In the following, only the steps that differ from the steps described above will be explained.

At step S1005, when the matching check unit 901 determines that the header information Code00 of all the four lanes (LANE0 to LANE3) is identical, the matching check unit 901 sets an address of the header information Code00 to the read address (RD_ADR) 923 in the buffer part 914, but with respect to the other buffer parts (911, 912, and 913), the matching check unit 901 sets a next address of the header information Code00 (that is, the address of Data00, Data01, or Data02).

Specifically, the address of Data00 is set to the read address (RD_ADR) 923 in the buffer part 911, the address of Data01 is set to the read address (RD_ADR) 923 in the buffer part 912, and the address of Data02 is set to the read address (RD_ADR) 923 in the buffer part 913.

Next, at step S1006, each of the buffer parts 911 to 914 reads out 64-bit data from the address indicated by the read address 923. At step S1007, by using 4 pieces of the 64-bit data that are read out from the buffer parts 911 to 914 at step S1006, the data link layer 402 reconstructs 256-bit data, such as data of one line illustrated in FIG. 7. Note that the data link layer 402 reconstructs the 256-bit data by arranging the 4 pieces of the 64-bit data in the following order: data read out from the buffer part 914, data read out from the buffer part 911, data read out from the buffer part 912, and data read out from the buffer part 913. That is, the data that is read out from the buffer part 914 is placed at uppermost 64 bits, and the data that is read out from the buffer part 913 is placed at lowermost 64 bits.

By repeating steps S1006 and S1007, the packet as illustrated in FIG. 7 is reconstructed. Further, step S1006 (an operation of reading out data from the buffer parts 911 to 914) and step S1007 (an operation of arranging and reconstructing data) can be executed in parallel. That is, while the data link layer 402 is performing the above operation of arranging and reconstructing data at step S1007, step S1006 (for reading out next data to be reconstructed) may be executed.

The data communication device controls the timing of outputting the data Data00 to DataN0+3 of each of the four lanes (LANE0 to LANE3), without using an alignment marker 303 (illustrated in FIG. 3) periodically inserted in the transmission data, and by using the header information Code00. Accordingly, the data communication device controls the timing of outputting the data Data00 to DataN0+3 of each of the four lanes (LANE0 to LANE3), while reducing communication traffic. As the header information Code00 includes the packet destination information (ADDRESS) and is mandatory information for packet communication, having the header information Code00 does not lead to increase of communication traffic. The data communication device can reduce data latency by reducing communication traffic. Further, in the art described with reference to FIG. 3, conversion of lanes is performed such that the number of lanes is changed from 20 to 4. Conversely, in the present embodiment illustrated in FIG. 4, since the number of lanes is fixed to 4, a structure of the physical layer 403 can be simplified. Further, by using four lanes (LANE0 to LANE3), high-speed data communication can be realized. Although a case for employing the four lanes (LANE0 to LANE3) is described in the present embodiment, the number of lanes is not limited to 4 and other numbers of lanes can be employed.

According to the above detailed description, the features and the advantages of the embodiments will be made clear. All examples and conditional language provided herein are intended for pedagogical purposes of aiding the reader in understanding the invention and the concepts contributed by the inventors to further the art, and are not to be construed as limitation to such specifically recited examples and conditions, nor does the organization of such examples in the specification relate to a showing of superiority and inferiority of the invention. Although one or more embodiments of the present invention have been described in detail, it should be understood that various changes, substitutions, and alterations could be made hereto without departing from the spirit and scope of the invention.

What is claimed is:

1. A data communication device communicating with other devices via a plurality of communication paths, the data communication device including a plurality of buffers each corresponding to one of the plurality of communication paths, and a communication circuit configured to perform a transmission process and a reception process, the transmission process including
    receiving a packet containing header information and data,
    outputting start information to each of the communication paths,
    outputting, after the outputting of the start information, a same header information as the header information contained in the received packet to each of the communication paths,
    dividing the data into a plurality of data pieces, and
    outputting the data pieces to the respective communication paths; and
the reception process including
    receiving start information, header information, and a data piece for each of the communication paths,
    storing, for each of the communication paths, the start information, the header information, and the data piece received from a corresponding one of the communication paths, into a corresponding buffer of the plurality of buffers, and
    reconstructing a packet from the header information and the data piece stored in the plurality of buffers, wherein
the reconstructing of the packet includes
    identifying, for each of the communication paths, a location of the header information in the corresponding buffer based on the start information, and
    starting reading out the header information and the data piece from each of the buffers, in a case in which all the header information received and stored in the buffers is identical.

2. The data communication device according to claim 1, wherein
    the communication circuit is configured to convert, for each of the communication paths, the header information and the data piece from parallel data format to serial data format, before outputting the header information and the data piece to the communication path, and the communication circuit is configured to convert, for each of the communication paths, the received header information and the received data piece from serial data format to parallel data format.

3. The data communication device according to claim 1, wherein the header information includes destination information of the packet.

4. The data communication device according to claim 1, wherein the header information includes destination information and a packet number of the packet.

5. An arithmetic processing device communicating with other devices via a plurality of communication paths, the arithmetic processing device comprising:

a central processing unit (CPU) core configured to generate a packet containing data;

a router circuit configured to generate header information and to add the header information to the packet;

a plurality of buffers each corresponding to one of the plurality of communication paths; and a communication circuit configured to perform a transmission process and a reception process, the transmission process including receiving, from the router circuit, the packet containing the header information and the data, outputting start information to each of the communication paths, outputting, after the outputting of the start information, a same header information as the header information contained in the received packet to each of the communication paths, dividing the data into a plurality of data pieces, and outputting the data pieces to the respective communication paths; and the reception process including receiving start information, header information, and a data piece for each of the communication paths, storing, for each of the communication paths, the start information, the header information, and the data piece received from a corresponding one of the communication paths, into a corresponding buffer of the plurality of buffers, and reconstructing a packet from the header information and the data piece stored in the plurality of buffers, wherein the reconstructing of the packet includes identifying, for each of the communication paths, a location of the header information in the corresponding buffer based on the start information, and starting reading out the header information and the data piece from each of the buffers, in a case in which all the header information received and stored in the buffers is identical.

6. A method of controlling a data communication device communicating with other devices via a plurality of communication paths, the data communication device including a plurality of buffers each corresponding to one of the plurality of communication paths, the method comprising:

performing, by a communication circuit in the data communication device, a transmission process including receiving a packet containing header information and data, outputting start information to each of the communication paths, outputting, after the outputting of the start information, a same header information as the header information contained in the received packet to each of the communication paths, dividing the data into a plurality of data pieces, and outputting the data pieces to the respective communication paths; and performing, by the communication circuit, a reception process including receiving start information, header information, and a data piece for each of the communication paths, storing, for each of the communication paths, the start information, the header information, and the data piece received from a corresponding one of the communication paths, into a corresponding buffer of the plurality of buffers, and reconstructing a packet from the header information and the data piece stored in the plurality of buffers, wherein the reconstructing of the packet includes identifying, for each of the communication paths, a location of the header information in the corresponding buffer based on the start information, and starting reading out the header information and the data piece from each of the buffers, in a case in which all the header information received and stored in the buffers is identical.

* * * * *